United States Patent [19]
Russell

[11] Patent Number: 5,388,738
[45] Date of Patent: Feb. 14, 1995

[54] SIDE MOUNT RACK

[76] Inventor: John Russell, 1707B Hillside Dr. South, North Myrtle Beach, S.C. 29582

[21] Appl. No.: 121,917

[22] Filed: Sep. 17, 1993

[51] Int. Cl.⁶ ............................................. B60R 9/02
[52] U.S. Cl. ...................... 224/42.45 R; 224/42.46 R; 224/917
[58] Field of Search .............. 224/42.45 R, 42.46, 224/917

[56] References Cited

U.S. PATENT DOCUMENTS

| | | | |
|---|---|---|---|
| 1,778,771 | 10/1930 | Pritchard | 224/42.45 R |
| 1,919,271 | 7/1933 | Cady | 224/42.45 R |
| 2,302,300 | 11/1942 | Davies | 224/42.45 R |
| 2,782,973 | 2/1957 | Lang | 224/917 |
| 3,172,633 | 3/1965 | Allen | 224/42.45 R |
| 4,077,864 | 2/1977 | Hreha | 224/42.46 R |
| 4,944,434 | 7/1970 | Hamilton | 224/42.45 R |
| 5,115,955 | 5/1992 | Dallaire et al. | 224/917 |

Primary Examiner—Renee S. Luebke
Attorney, Agent, or Firm—Hugh E. Smith

[57] ABSTRACT

An easily mountable and removable rack for carrying long items such as surfboards and the like on a vehicle. The inventive device includes a first main portion positionable between a window of the vehicle and an adjoining vehicle door panel. A second substantially U-shaped main portion is adjustably coupled to the first main portion and is operable to receive a load to support the same relative to the vehicle. Preferably, the device is utilized in pairs to support elongated objects along the length of the vehicle.

7 Claims, 4 Drawing Sheets

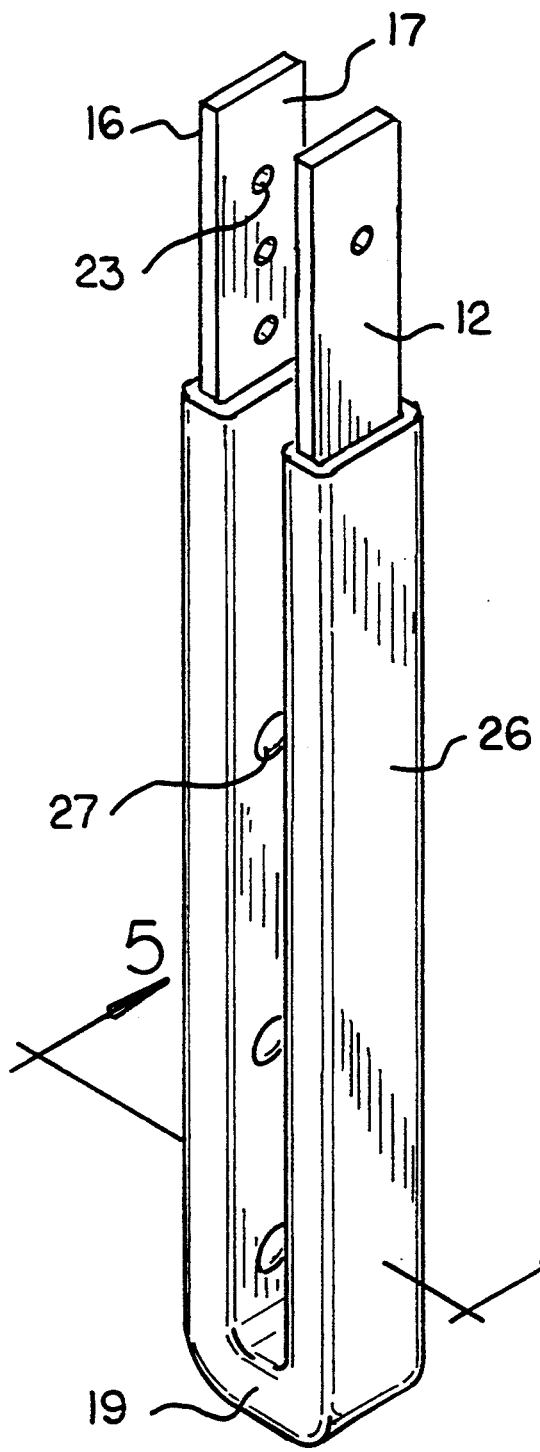
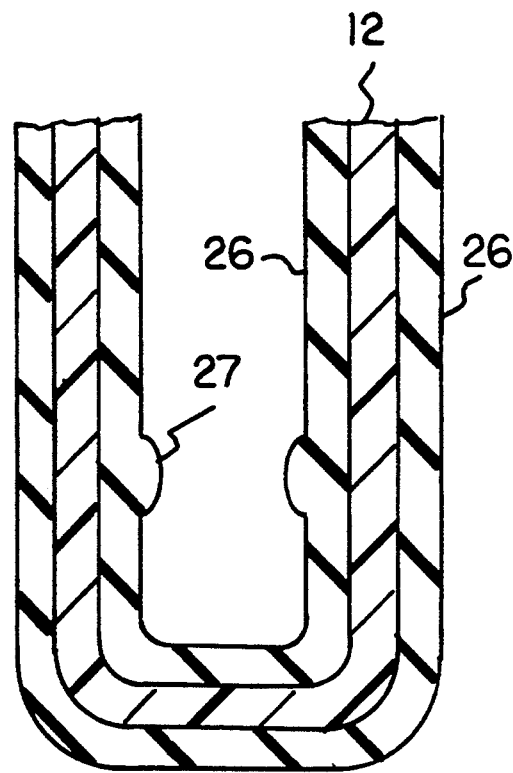

SIDE MOUNT RACK

BACKGROUND OF THE INVENTION

1. Field of the Invention

The present invention relates to vehicle racks and more particularly pertains to such racks which are mounted on the side of a vehicle.

2. Description of the Prior Art

The use of side mounted vehicle racks is known in the prior art. More specifically, racks heretofore devised and utilized for the purpose of side mounting on vehicles are known to consist basically of familiar, expected and obvious structural configurations, notwithstanding the myriad of designs encompassed by the crowded prior art which have been developed for the fulfillment of countless objectives and requirements.

More specifically, such prior art racks have frequently been mounted by hooks engaging inside the hood and trunk portion of vehicles as illustrated by U.S. Pat. Nos. 4,596,348; 4,108,342; and 5,029,785. Due to the provision of internal channels or gutters of varying configurations within the hoods and trunks of vehicles, such racks frequently need to be customized for a particular vehicle and in any event require adjustment of the portions designed to fasten within such hood and trunk. Other racks have been designed to enter open vehicle windows and hoods thereover, e.g. U.S. Pat. Nos. 4,942,989 and 4,607,773, creating an obvious problem in case of rain. Sliding between the window glass and its associated weatherstripping attached to the car body as does the rack of the present invention obviates these problems and, since the clearance is essentially the same for all vehicles, the rack of the present invention is universal in its installation.

In this respect, the side mounted rack according to the present invention substantially departs from the conventional concepts and designs of the prior art, and in so doing provides an apparatus primarily developed for the purpose of ease and universality of use.

Therefore, it can be appreciated that there exists a continuing need for new and improved racks which can be side mounted on a vehicle. In this regard, the present invention substantially fulfills this need.

SUMMARY OF THE INVENTION

In view of the foregoing disadvantages inherent in the known types of racks now present in the prior art, the present invention provides an improved side mount rack construction wherein the same can be utilized on essentially all vehicles and can be attached and removed with ease. As such, the general purpose of the present invention, which will be described subsequently in greater detail, is to provide a new and improved side mount rack which has all the advantages of the prior art racks and none of the disadvantages.

To attain this, the present invention essentially relates to an easily mountable and removable rack for carrying long items such as surfboards or the like on a vehicle which comprises a pair of thin, rigid and resilient members having an inner portion adapted to fit into the slot between a vehicle window and the door frame of a vehicle, said resilient members being formed into a downwardly extending "U" shape; a long, flexible strip affixed to the bottom end of the downwardly extending outer portion of each of said thin, rigid, resilient U-shaped members, said strip extending downwardly towards the base of the vehicle frame and then upwardly to form an upwardly extending "U" shape, thereby providing a load supporting portion at the base of said upwardly extending U-shape; flexible tie means affixed to the downwardly extending portion of each of said flexible strips to fasten the same to the frame of the vehicle and a further flexible tie means at the upper end of the upwardly extending portion of such flexible strips to fasten such ends to the outer portion of said resilient members. The invention also contemplates the provisions of vertical adjustments between the flexible strip and its associated rigid member and the provision of further cushioning and gripping means on said flexible strips.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved side mount rack which has all the advantages of the prior art racks and none of the disadvantages.

It is another object of the present invention to provide a new and improved side mount rack which may be easily and efficiently manufactured and marketed.

It is a further object of the present invention to provide a new and improved side mount rack which is of a durable and reliable construction.

An even further object of the present invention is to provide a new and improved side mount rack which is susceptible of a low cost of manufacture with regard to both materials and labor, and which accordingly is then susceptible of low prices of sale to the consuming public, thereby making such racks economically available to the buying public.

Still yet another object of the present invention is to provide a new and improved side mount rack which provides in the apparatuses and methods of the prior art some of the advantages thereof, while simultaneously overcoming some of the disadvantages normally associated therewith.

Still another object of the present invention is to provide a new and improved universal side mount rack.

Yet another object of the present invention is to provide a new and improved side mount rack which is capable of easy installation and removal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a partial perspective view of the load-carrying portion of the device of the present invention illustrating supplemental padding and load gripping means.

FIG. 5 is a partial sectional view on line 5—5 of FIG. 4.

DESCRIPTION OF THE PREFERRED EMBODIMENT

Figure 1:
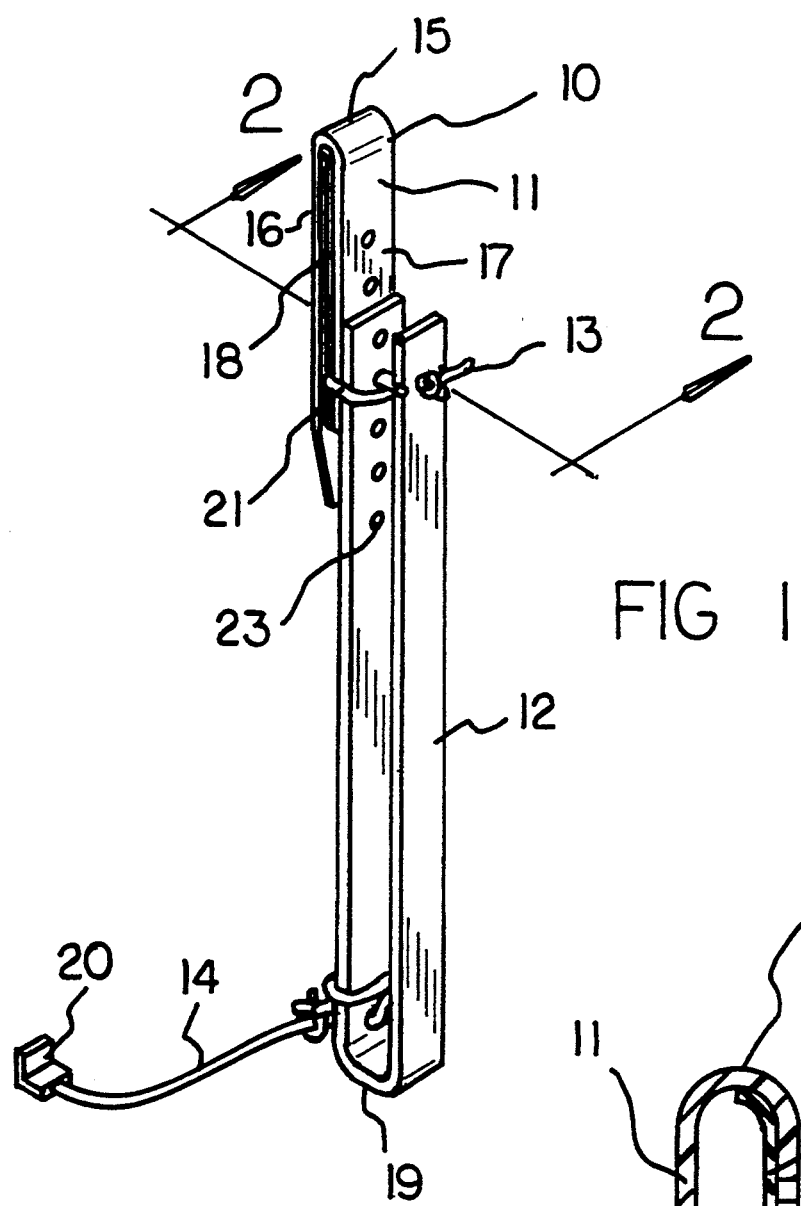
FIG. 1 is a perspective view of the basic device of the present invention.

With reference now to the drawings, and in particular to FIG. 1 thereof, a new and improved side mount rack embodying the principles and concepts of the present invention and generally designated by the reference numeral 10 will be described.

More specifically, it will be noted that rack 10 consists of two main portions 11 and 12 and several ancillary portions 13 and 14. The main portion 11 comprises a thin flat, rigid strip 15 having an inner downwardly extending section 16 and an outer downwardly extending section 17. These are preferably formed by bending such rigid strip 15 into a U-shaped configuration with the open end of the "U" pointing downward in use. The spacing between the two downwardly extending sections 16 and 17 is such as to permit section 16 to be inserted between the window glass of a vehicle and for the outer section 17 to resiliently engage with the outer surface of the associated vehicle door panel. A soft, resilient non-scratch backing 18 such as silicone rubber is applied to the inside surface of section 17 to prevent marring of the vehicle finish. Secured adjacent the base of the outer section 17 is the second main portion 12 mentioned above. This comprises a long flexible resilient strip preferably formed of a plastic such as "Lexan". The strip 12 is long enough to extend from the base of outer section 17 substantially to the bottom of the vehicle frame on which the rack 10 is mounted, and thence back up at least again to the base of outer section 17 of portion 11. Strip 12 thus forms a loop or upwardly extending U-shape with the base 19 of such loop providing a support section for the load to be carried in rack 10. Secured to strip 12 near the base 19 of such loop is an adjustable flexible tie member 14 having at its other end a hook 20 adapted to engage the bottom frame of the vehicle on which rack 10 is mounted. Once the height above the vehicle frame base is determined for the base 19 of the loop formed by strip 12 (dictated by the type of load to be carried on such base 19), tie 14 is tightened to hold the strip 12 closely against the vehicle door panel. The free end of strip 12 is then drawn up either before the load to be carried is inserted or after the load has been positioned so as to engage base 19, and is fastened to rigid strip 17 by another flexible tie member 13. Tie member 13 is secured to flexible strip 12 by passing through a hole therein and may merely be wrapped around rigid strip 17 and tied. Preferably, however, tie 13 has a hook 21 on the end thereof adapted to engage in one of a plurality of perforations 22 in rigid strip 17 at the appropriate height for the desired positioning of base 19 of the strip 12. Corresponding perforations 23 are provided in strip 12 for the passage of tie 13.

Figure 2:
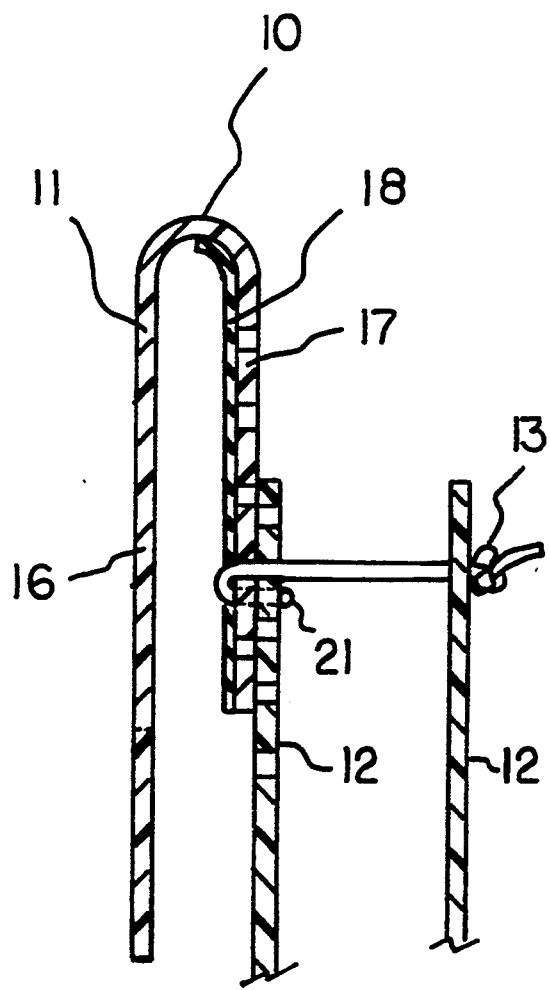
FIG. 2 is a sectional view on line 2—2 of the upper portion of the device of FIG. 1.
Figure 3:
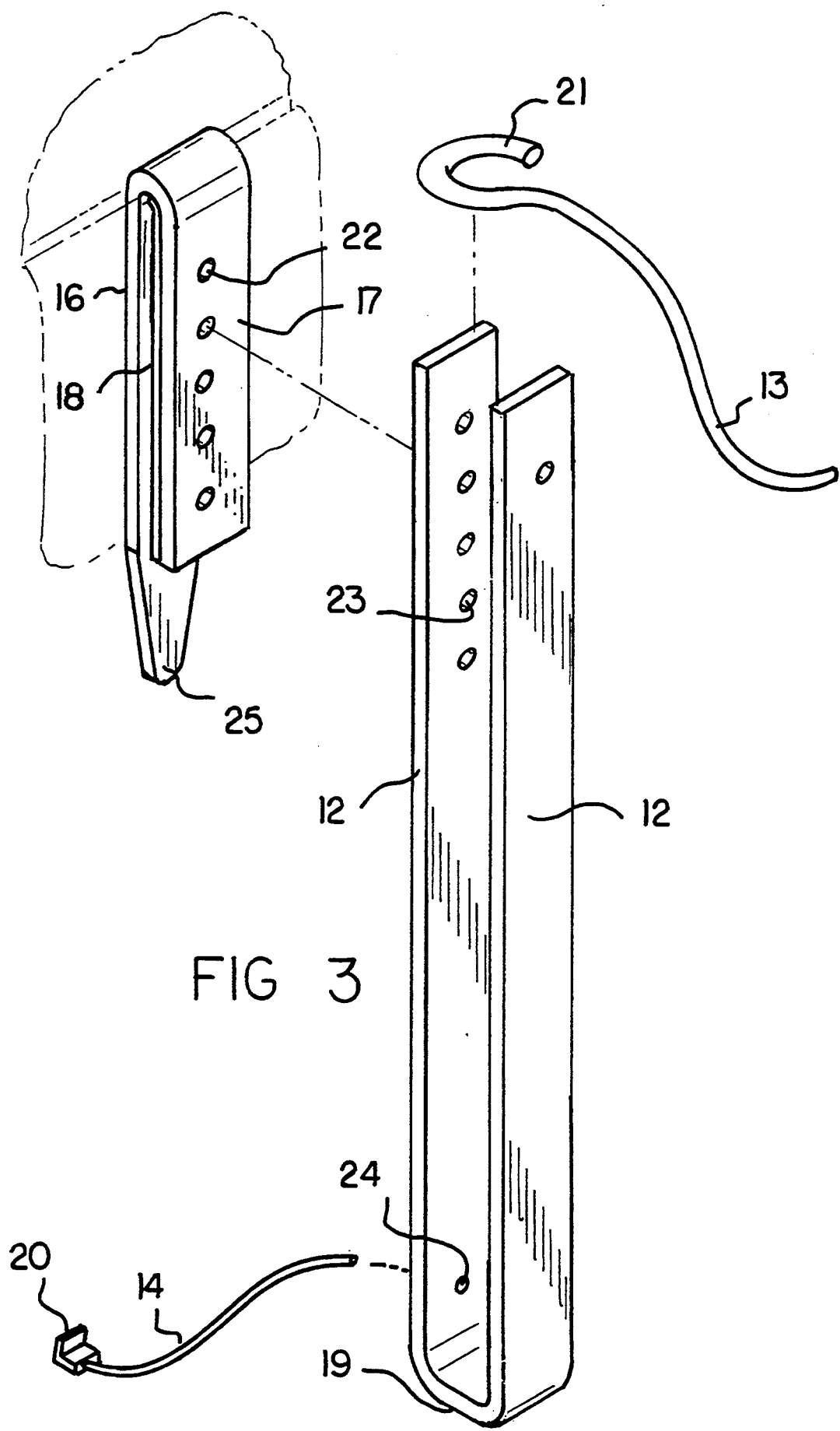
FIG. 3 is an exploded perspective view of the device of FIG. 1.

FIG. 3 shows in an exploded view the elements previously described in connection with FIGS. 1 and 2. The relationship between the main portion 11 with its sections 16 and 17 and the vehicle glass and door panel (shown in broken lines) is illustrated herein. Also, it will be noted that the member 14 (like tie member 13) is secured to strip 12 by passing through a perforation 24 therein. Also as shown at 25, the lower end of section 16 is preferably tapered to permit easier insertion into the gap between window glass and frame of the vehicle.

FIGS. 4, 5, 6 and 7 illustrate the addition of a slip-over sleeve 26 designed to slide over the free end of strip 12. Sleeve 26 is preferably formed of a cushioning material such as open cell foam and, as shown in FIGS. 4 and 5, has a plurality of knobs or protrusions 27 on the inner surface thereof. (The term "inner" here refers to the inside of the loop formed by strip 12 when in load carrying position.) Protrusions 27 will engage with the load and help to keep it from sliding longitudinally on the load support section 19.

Figure 6:
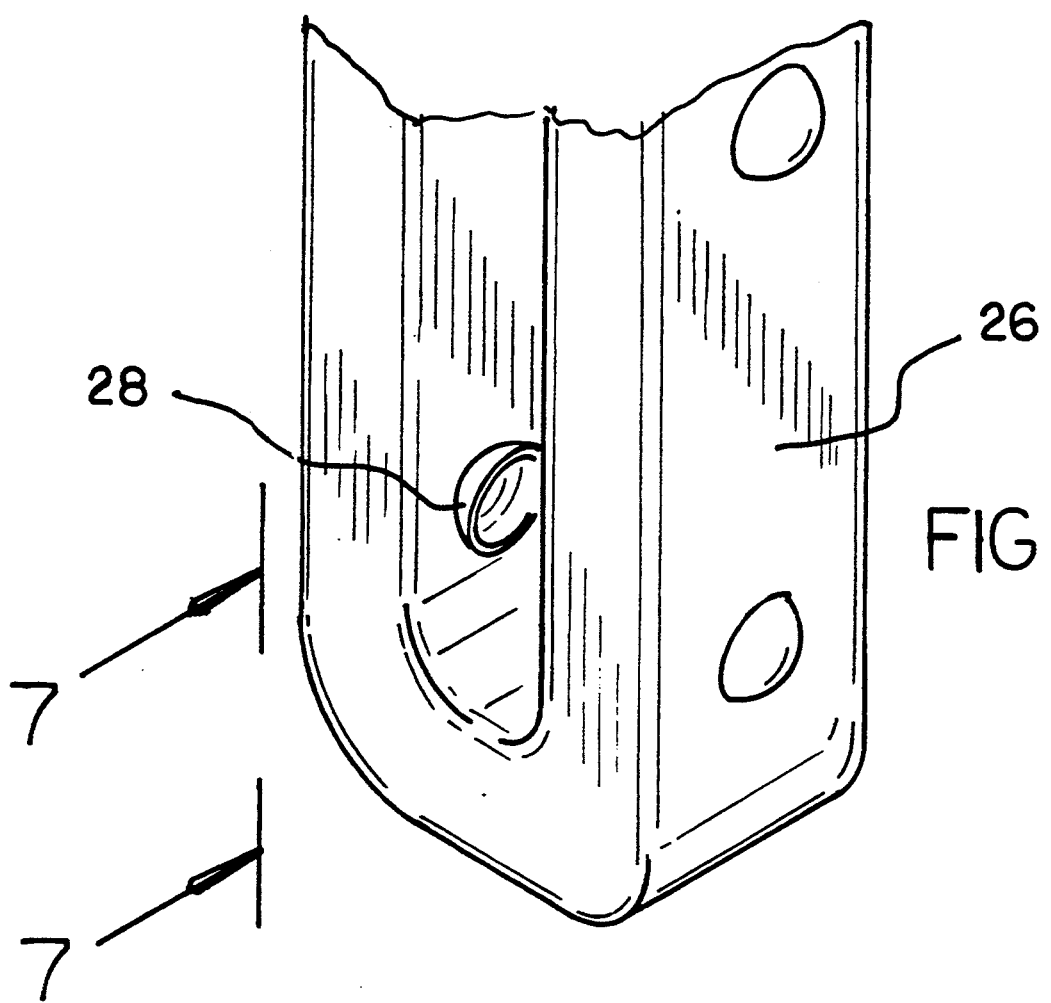
FIG. 6 is a perspective view of a modification of the device of FIGS. 4 and 5.
Figure 7:
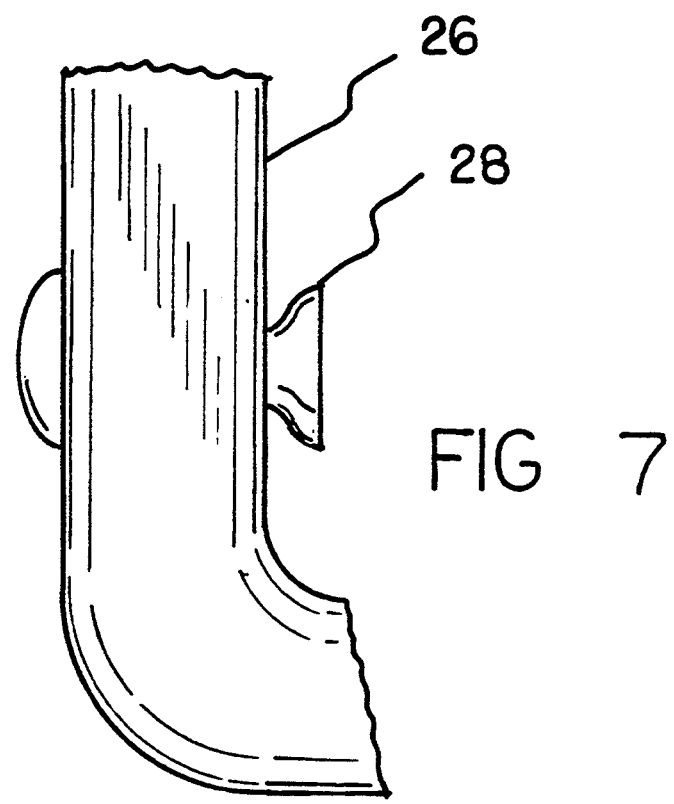
FIG. 7 is an enlarged view on line 7—7 of FIG. 6.

FIGS. 6 and 7 show the substitution of suction cups 28 for protrusions 27, particularly adapted to engage with the surface of a surfboard or other flat surfaced article carried in the rack to provide more positive longitudinal resistance.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A side mount rack designed to carry long items on a side of a vehicle, said side mount rack comprising:
   a first main portion member formed into a U-shape and having one inner end thereof downwardly extending to fit into a space between a vehicle glass window and a door frame in which said vehicle glass window is mounted, with an outer end of said first main portion member downwardly extending into resilient engagement with an exterior panel of said vehicle, said outer end of said first main portion member having a plurality of through-extending first main portion apertures positioned therealong;
   a second main portion member having a first end and a second end, said second main portion member having a plurality of first end apertures extending therethrough proximal to said first end thereof and at least one second end aperture extending therethrough and proximal to said second end thereof, said second main portion being substantially U-shaped and having a second tie member aperture extending through a center portion thereof, said second main portion being coextensive such that said first end and said second end of said second main portion are aligned and extend to a single vertical height;
   a first flexible tie extending through an individual one of said plurality of through-extending first main portion apertures, an individual one of said plurality of first end apertures, and said at least one second end aperture to removably couple said second main portion member to said first main portion member, and further to removably couple said second end of said second main portion member to said first end thereof to removably capture an object within said second main portion member;
   a second flexible tie extending through said second tie member aperture of said center portion of said second main portion member; and,
   a hook coupled to a distal end of said second flexible tie member, said hook being operable to engage a portion of said vehicle.

2. The side mount rack of claim 1, and further comprising an enclosing sleeve, said sleeve being received over said second main portion member.

3. The side mount rack of claim 2, wherein said sleeve includes an interior surface with a plurality of protuberances extending from said interior surface thereof.

4. The side mount rack of claim 3, wherein said protuberances are suction cups.

5. The side mount rack of claim 4, wherein said inner end of said first main portion member is tapered to facilitate insertion into said space between said vehicle glass window and said door frame.

6. The side mount rack of claim 5, and further comprising a resilient backing coupled to an interior surface of said first main portion member to protect an exterior finish of said vehicle.

7. A side mount rack designed to carry long items on a side of a vehicle and to be easily mountable thereon and removable therefrom which comprises: a pair of resilient members each formed into a U-shape and having one inner end thereof downwardly extending to fit into a space between a vehicle glass window and a door frame in which it is mounted, with an outer end downwardly extending in resilient engagement with an exterior panel on the vehicle; a long, flexible strip affixed to each of said outer ends of said resilient members and extending downwardly towards a frame of said vehicle and thence upwardly to at least said outer ends of said resilient members; flexible adjustable tie means securing a downwardly extending portion of each of said flexible strips to the frame of said vehicle; and further flexible adjustable tie means securing upwardly extending portions of said flexible strips to the outer ends of said resilient members,
   wherein said inner ends of said resilient members are tapered to facilitate insertion into the space between the vehicle glass window and the door frame in which it is mounted,
   wherein inside surfaces of at least the outer ends of said resilient members carry a resilient backing thereon to protect an exterior finish of the vehicle,
   wherein a plurality of perforations are provided in the outer ends of said resilient members and correspondingly in the upper ends of said flexible strips to accept said further flexible adjustable tie means therethrough,
   wherein a soft cushioned enclosing sleeve is slipped over each of said flexible strips, said sleeve having on its surface load-engaging protuberances, wherein said protuberances are suction cups.

* * * * *